(12) United States Patent
Suwa et al.

(10) Patent No.: US 8,911,873 B2
(45) Date of Patent: Dec. 16, 2014

(54) PRESSURE SENSITIVE ADHESIVE SHEET FOR OPTICS

(75) Inventors: Toshihiro Suwa, Sagamihara (JP); Shogo Sakakibara, Sagamihara (JP); Sotaro Endo, Tokyo (JP); Saori Ueda, Sagamihara (JP); Shunsuke Suzuki, Kawasaki (JP)

(73) Assignee: 3M Innovative Properties Company, St. Paul, MN (US)

( * ) Notice: Subject to any disclaimer, the term of this patent is extended or adjusted under 35 U.S.C. 154(b) by 134 days.

(21) Appl. No.: 13/581,816

(22) PCT Filed: Mar. 7, 2011

(86) PCT No.: PCT/US2011/027387
§ 371 (c)(1),
(2), (4) Date: Aug. 30, 2012

(87) PCT Pub. No.: WO2011/112508
PCT Pub. Date: Sep. 15, 2011

(65) Prior Publication Data
US 2012/0328891 A1 Dec. 27, 2012

(30) Foreign Application Priority Data
Mar. 9, 2010 (JP) ................................ 2010-051768

(51) Int. Cl.
*B32B 27/30* (2006.01)
*B32B 38/04* (2006.01)
*C09J 133/08* (2006.01)
*C09J 7/02* (2006.01)

(52) U.S. Cl.
CPC .............. *C09J 133/08* (2013.01); *C09J 7/0246* (2013.01); *C09J 2203/318* (2013.01); *C09J 2433/00* (2013.01)
USPC ........................................ 428/522; 156/275.5

(58) Field of Classification Search
None
See application file for complete search history.

(56) References Cited

U.S. PATENT DOCUMENTS

| 4,737,559 A | 4/1988 | Kellen et al. |
| 5,128,388 A | 7/1992 | Komori et al. |
| 2006/0155000 A1 | 7/2006 | Inenaga |
| 2010/0227949 A1* | 9/2010 | Tamai et al. .................. 523/400 |

FOREIGN PATENT DOCUMENTS

| EP | 1 447 799 | 8/2004 |
| EP | 1 632 541 | 3/2006 |
| JP | 62-284651 | 12/1987 |
| JP | 1-141969 | 6/1989 |
| JP | 2004-262957 | 9/2004 |
| WO | WO 03/095578 | 11/2003 |

* cited by examiner

*Primary Examiner* — Sheeba Ahmed
(74) *Attorney, Agent, or Firm* — Ann K. Gallagher

(57) ABSTRACT

An ultraviolet cross-linkable pressure sensitive adhesive sheet includes a (meth)acrylic copolymer of a monomer containing a (meth)acrylic acid ester having an ultraviolet cross-linkable site. The storage modulus of the pressure sensitive adhesive sheet before ultraviolet cross-linking is from $5.0 \times 10^4$ to $1.0 \times 10^6$ Pa at 30° C. and 1 Hz and $5.0 \times 10^4$ Pa or less at 80° C. and 1 Hz. The storage modulus of the pressure sensitive adhesive sheet after ultraviolet cross-linking is $1.0 \times 10^3$ Pa or more at 130° C. and 1 Hz.

7 Claims, 1 Drawing Sheet

PRESSURE SENSITIVE ADHESIVE SHEET FOR OPTICS

TECHNICAL FIELD

The present invention generally relates to a pressure sensitive adhesive sheet useful for display and touch panels. More specifically, the present invention relates to an ultraviolet cross-linkable pressure sensitive adhesive sheet.

BACKGROUND

In an image display module of electronic devices, such as mobile handheld devices, computer displays and touch panels, a glass or a plastic film is laminated as a surface protective layer. Such a surface protective layer is fixed to an image display module or touch panel by applying a frame-shaped tape or adhesive to the margin outside of the image display portion or outside the active region of the touch panel. As a result, a gap is formed between the image display portion or the active region of the touch panel and the surface protective layer.

There has been a trend in the industry of replacing the gap between the image display module or touch panel and the surface protective layer with a transparent substance that nearly matches the refractive indices of these materials to enhance the transparency and to improve image clarity. Illustrative transparent substances include, but are not limited to: pressure sensitive adhesives, adhesives, silicon gels and the like. When an adhesive is used, it is difficult to separate and replace the surface protective layer when, for example, a defect is produced after laminating the surface protective layer and the image display module. Silicone gel has a reliability problem because of its low adhesive force. On the other hand, a pressure sensitive adhesive (for example, a pressure sensitive adhesive sheet) allows re-lamination, despite a sufficiently high adhesive force, and therefore is effective in laminating a surface protective layer to an image display module or a touch panel.

The surface of an adherend such as an image display module, optical member or surface protective layer is sometimes uneven. The surface of the surface protective layer, particularly the surface coming into contact with the pressure sensitive adhesive sheet, is often subjected to printing for the purpose of decoration or light shielding. In some instances, the printed portion produces a step of 10 µm or more in height on the surface of the surface protective layer. One potential problem with laminating an image display module or a touch panel with a surface protective layer using a pressure sensitive adhesive sheet is that the pressure sensitive adhesive sheet may be insufficient in conformability to the step and causes a gap on or near the step. Furthermore, color unevenness can be generated in a liquid crystal display due to excessively large stress resulting from deformation of the pressure sensitive adhesive. To avoid these problems, the pressure sensitive adhesive sheet thickness should typically be about 10 times the step height. Even when the thickness is as large as 10 times or more of the step height, if a pressure sensitive adhesive with poor stress relaxation is used, laminating requirements may not be satisfied.

Kokai (Japanese Unexamined Patent Publication) No. 2004-262957 describes a hot melt-type ultraviolet cross-linking transparent pressure sensitive adhesive containing, as a radical photoinitiator, at least a hydrogen abstraction-type radical photoinitiator in a ratio of 0.01 to 1.0 wt % based on a (meth)acrylic acid ester-based copolymer, and a pressure sensitive adhesive sheet obtained by hot-melt forming such a pressure sensitive adhesive and irradiating an ultraviolet ray thereon to effect cross-linking.

SUMMARY

In view of reducing the size and thickness of an image display device or enhancing the sensitivity of a touch panel, the thickness of the pressure sensitive adhesive sheet is preferably as small as possible. An object of this disclosure is to provide a thin (for example, from 30 to 50 µm-thick) pressure sensitive adhesive sheet applicable to a surface having a step or a bump.

According to one embodiment of this disclosure, an ultraviolet cross-linkable pressure sensitive adhesive sheet including a (meth)acrylic copolymer of a monomer containing a (meth)acrylic acid ester having an ultraviolet cross-linkable site is provided, wherein the storage modulus of the pressure sensitive adhesive sheet before ultraviolet cross-linking is from about $5.0 \times 10^4$ to about $1.0 \times 10^6$ Pa at 30° C. and 1 Hz and about $5.0 \times 10^4$ Pa or less at 80° C. and 1 Hz and the storage modulus of the pressure sensitive adhesive sheet after ultraviolet cross-linking is about $1.0 \times 10^3$ Pa or more at 130° C. and 1 Hz.

According to another embodiment of this disclosure, a laminate including a first substrate having a step or a bump on at least one surface, a second substrate and the above-described ultraviolet cross-linkable pressure sensitive adhesive sheet disposed between the first substrate and the second substrate is provided. The at least one surface of the first substrate is in contact with the ultraviolet cross-linkable pressure sensitive adhesive sheet and the ultraviolet cross-linkable pressure sensitive adhesive sheet conforms to the step or bump.

According to still another embodiment of this disclosure, a method of producing a laminate including a first substrate having a step or a bump on at least one surface, a second substrate and the above-described ultraviolet cross-linkable pressure sensitive adhesive sheet disposed between the first substrate and the second substrate is provided. The production method includes disposing the ultraviolet cross-linkable pressure sensitive adhesive sheet to adjoin the first substrate on the at least one surface side; disposing the second substrate to adjoin the ultraviolet cross-linkable pressure sensitive adhesive sheet; heating and/or pressurizing the ultraviolet cross-linkable pressure sensitive adhesive sheet to conform to the step or bump; and irradiating an ultraviolet ray on the ultraviolet cross-linkable pressure sensitive adhesive sheet.

The ultraviolet cross-linkable pressure sensitive adhesive sheet of this disclosure can be used, for example, to laminate together an image display module or an optical member (such as a liquid crystal panel or touch panel) and a surface protective layer (such as resin film or glass). In the case where the image display module or optical member and/or the surface protective layer has a surface that is not flat due to a printing-related step or various processing treatments, in order to allow the pressure sensitive adhesive sheet to conform to such a surface, the thickness of a conventional pressure sensitive adhesive sheet typically should be, for example, about 10 times the step height (for example, a thickness of 100 to 175 µm for a step of 10 to 20 µm in height). The pressure sensitive adhesive sheet of this disclosure can be made to sufficiently conform to the step or bump by applying heat and/or pressure at a stage before ultraviolet cross-linking, even though the thickness thereof is nearly equal to the height of the step or bump (for example, from 20 to 30 µm). As a result, a gap or the like is not produced in the vicinity of the step or bump, and the internal residual stress of the pressure sensitive adhesive sheet is kept from unduly rising near the step or bump. After laminating the pressure sensitive adhesive sheet to an adherend, ultraviolet cross-linking is performed, whereby highly reliable adhesion can be realized. Accordingly, the laminate including an adherend can be kept thin and at the same time, can enjoy lamination free of a defect such as gap or color unevenness of a liquid crystal display. According to this disclosure, for example, reduction in size and thickness of an image display device or enhancement of sensitivity of a touch panel can be achieved.

Also, in a pressure sensitive adhesive sheet formed using a conventional ultraviolet cross-linkable hot melt pressure sensitive adhesive, which is generally composed of a mixture of a thermoplastic base polymer having a high molecular weight and a cross-linkable component having a low molecular weight, bleed-out of the cross-linkable component or microscopic or macroscopic phase separation may occur thereby reducing the transparency of the pressure sensitive adhesive sheet. The (meth)acrylic copolymer contained in the ultraviolet cross-linkable pressure sensitive adhesive sheet of this disclosure can perform ultraviolet cross-linking by itself. That is to say, a cross-linkable component such as a multifunctional monomer or oligomer need not be further added to the pressure sensitive adhesive sheet, so that the above-described problem of reduced transparency due to the cross-linkable component can be avoided. Accordingly, the pressure sensitive adhesive sheet of this disclosure is assured of high transparency and useful for applications requiring excellent optical characteristics.

Furthermore, the ultraviolet cross-linkable pressure sensitive adhesive sheet of this disclosure is easy to handle compared with a liquid adhesive, and is designed to enhance the adhesive force after ultraviolet cross-linking. Therefore temporary adhesion, re-positioning or the like before ultraviolet cross-linking is facilitated. Accordingly, this pressure sensitive adhesive sheet can be advantageously used for lamination of a surface protective layer to a large object (for example, a large-size liquid crystal module).

Incidentally, the description above should not be construed as disclosing all of the embodiments of the present invention and all of the advantages relating to the present invention.

DETAILED DESCRIPTION

Figure 1:
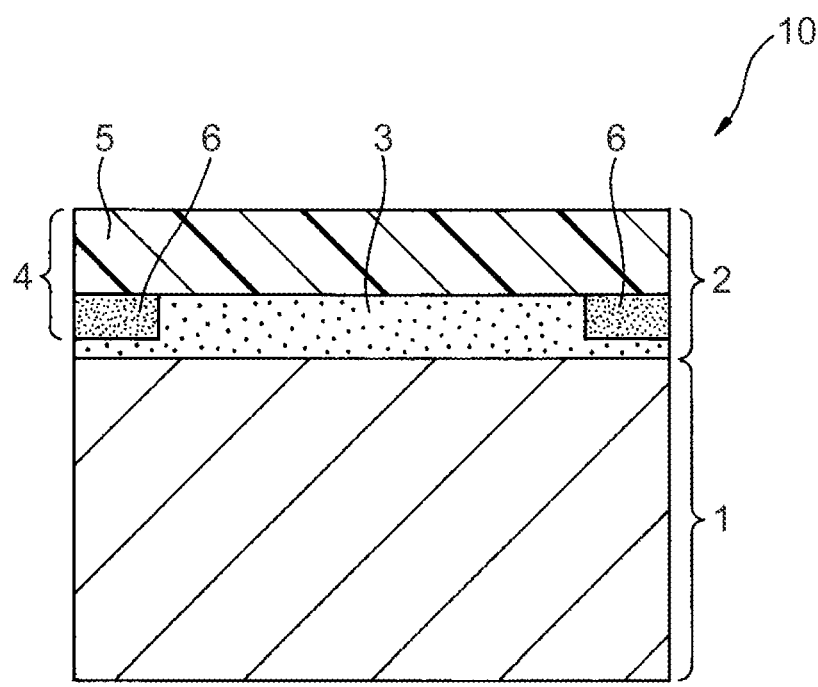
FIG. 1 is a cross-sectional view of one embodiment of an image display device containing an ultraviolet cross-linkable pressure sensitive adhesive sheet of this disclosure.

The present invention is described in detail below for the purpose of illustrating the representative embodiments of the invention, but the present invention is not limited to these embodiments.

The term "ultraviolet cross-linkable site" as used in the specification of the present invention indicates a site capable of being activated by ultraviolet irradiation and forming a cross-linking with another portion in the (meth)acrylic copolymer molecule or with another (meth)acrylic copolymer molecule.

The term "(meth)acrylic" is "acrylic" or "methacrylic", and the "(meth)acrylate" means "acrylate" or "methacrylate".

The term "storage modulus" is a storage modulus at a designated temperature when the viscoelasticity is measured in a shear mode at a temperature rising rate of 5° C./min and 1 Hz in a temperature range of −60 to 200° C.

The term "hydrophilic monomer" is a monomer having good affinity for water, specifically, a monomer that dissolves in an amount of 5 g or more per 100 g of water at 20° C.

The ultraviolet cross-linkable pressure sensitive adhesive sheet in one embodiment of this disclosure comprises a (meth)acrylic copolymer of a monomer containing a (meth)acrylic acid ester having an ultraviolet cross-linkable site. The storage modulus of the pressure sensitive adhesive sheet before ultraviolet cross-linking is from about $5.0 \times 10^4$ to about $1.0 \times 10^6$ Pa at 30° C. and 1 Hz and about $5.0 \times 10^4$ Pa or less at 80° C. and 1 Hz, and the storage modulus of the pressure sensitive adhesive sheet after ultraviolet cross-linking is about $1.0 \times 10^3$ Pa or more at 130° C. and 1 Hz.

The pressure sensitive adhesive sheet of this disclosure has the above-described viscoelastic characteristics at a stage before ultraviolet cross-linking, so that the pressure sensitive adhesive sheet can be made to conform to a step or a bump on the surface of an adherend such as a surface protective layer by applying heat and/or pressure after laminating together the pressure sensitive adhesive sheet and the adherend at an ordinary working temperature. Thereafter, when ultraviolet cross-linking is performed, the cohesive force of the pressure sensitive adhesive sheet is raised, as a result, due to the viscoelastic characteristics mentioned above of the pressure sensitive adhesive sheet, highly reliable adhesion can be realized.

In addition, the (meth)acrylic copolymer contained in the pressure sensitive adhesive sheet can perform the ultraviolet cross-linking by itself. Thus, a cross-linkable component having a low molecular weight, such as a multifunctional monomer or oligomer, need not be generally added to the pressure sensitive adhesive sheet. In a pressure sensitive adhesive sheet formed using a conventional ultraviolet cross-linkable hot melt pressure sensitive adhesive, which is generally composed of a mixture of a thermoplastic base polymer having a high molecular weight and a cross-linkable component having a low molecular weight, bleed-out of the cross-linkable component or microscopic or macroscopic phase separation may occur thereby reducing the transparency of the pressure sensitive adhesive sheet. However, the pressure sensitive adhesive sheet of this disclosure can avoid such a problem due to the cross-linkable component, and therefore is assured of high transparency, which is advantageous for applications requiring excellent optical characteristics, such as image display devices and touch panels.

As for the (meth)acrylic acid ester having an ultraviolet cross-linkable site, a (meth)acrylic acid ester having, as defined above, a site capable of being activated by ultraviolet irradiation and forming a cross-linking with another portion in the (meth)acrylic copolymer molecule or with another (meth)acrylic copolymer molecule can be used. There are various structures acting as an ultraviolet cross-linkable site. For example, a structure capable of being excited by ultraviolet irradiation and extracting a hydrogen radical from another portion in the (meth)acrylic copolymer molecule or from another (meth)acrylic copolymer molecule can be employed as the ultraviolet cross-linkable site. Examples of such a structure include a benzophenone structure, a benzyl structure, an o-benzoylbenzoic acid ester structure, a thioxanthone structure, a 3-ketocoumarin structure, a 2-ethylanthraquinone structure and a camphorquinone structure. Each of these structures can be excited by ultraviolet irradiation and in the excited state, can extract a hydrogen radical from the (meth)acrylic copolymer molecule. In this way, a radical is produced on the (meth)acrylic copolymer to cause various reactions in the system, such as formation of a cross-linked structure due to bonding of produced radicals with each other, production of a peroxide radical by a reaction with an oxygen molecule, formation of a cross-linked structure through the produced peroxide radical, and extraction of another hydrogen radical by the produced radical, and the (meth)acrylic copolymer is finally cross-linked.

Among the structures above, a benzophenone structure is advantageous in view of transparency, reactivity and the like. Examples of the (meth)acrylic acid ester having such a benzophenone structure include, but are not limited to: 4-acryloyloxybenzophenone, 4-acryloyloxyethoxybenzophenone, 4-acryloyloxy-4'-methoxybenzophenone, 4-acryloyloxyethoxy-4'-methoxybenzophenone, 4-acryloyloxy-4'-bromobenzophenone, 4-acryloyloxyethoxy-4'-bromobenzophenone, 4-methacryloyloxybenzophenone, 4-methacryloyloxyethoxybenzophenone, 4-methacryloyloxy-4'-methoxybenzophenone, 4-methacryloyloxyethoxy-4'-methoxybenzophenone, 4-methacryloyloxy-4'-bromobenzophenone, 4-methacryloyloxyethoxy-4'-bromobenzophenone, and mixtures thereof.

The amount of the (meth)acrylic acid ester having an ultraviolet cross-linkable site is, based on the total mass of monomers, generally about 0.1 mass % or more, about 0.2 mass % or more or about 0.3 mass % or more, and about 2 mass % or less, about 1 mass % or less, or about 0.5 mass % or less. By setting the amount of the (meth)acrylic acid ester having an ultraviolet cross-linkable site to about 0.1 mass % or more based on the total mass of monomers, the adhesive force of the pressure sensitive adhesive sheet after ultraviolet cross-linking can be enhanced and highly reliable adhesion can be achieved. By setting the amount to about 2 mass % or less, the modulus of the pressure sensitive adhesive sheet after ultraviolet cross-linking can be kept in an appropriate range.

Generally, for the purpose of imparting suitable viscoelasticity to the pressure sensitive adhesive sheet and ensuring good wettability to an adherend, the monomer constituting the (meth)acrylic copolymer contains a (meth)acrylic acid alkyl ester with the alkyl group having a carbon number of 2 to 12. Examples of such a (meth)acrylic acid alkyl ester include, but are not limited to, a (meth)acrylate of a non-tertiary alkyl alcohol with the alkyl group having a carbon number of 2 to 12 and mixtures thereof. Specific examples thereof include, but are not limited to: ethyl acrylate, ethyl methacrylate, n-butyl acrylate, n-butyl methacrylate, isobutyl acrylate, isobutyl methacrylate, hexyl acrylate, hexyl methacrylate, 2-ethylhexyl acrylate, 2-ethylhexyl methacrylate, isoamyl acrylate, isooctyl acrylate, isononyl acrylate, decyl acrylate, isodecyl acrylate, isodecyl methacrylate, lauryl acrylate, lauryl methacrylate, 2-methylbutyl acrylate, 4-methyl-2-pentyl acrylate, 4-tert-butylcyclohexyl methacrylate, cyclohexyl methacrylate, isobornyl acrylate, and mixtures thereof. In particular, ethyl acrylate, n-butyl acrylate, 2-ethylhexyl acrylate, isooctyl acrylate, lauryl acrylate, isobornyl acrylate, and mixtures thereof are suitably used.

The amount of the (meth)acrylic acid alkyl ester with the alkyl group having a carbon number of 2 to 12 is, based on the total mass of monomers, generally about 60 mass % or more, about 70 mass % or more, or about 80 mass % or more, and about 95 mass % or less, about 92 mass % or less, or about 90 mass % or less. By setting the amount of the (meth)acrylic acid alkyl ester with the alkyl group having a carbon number of 2 to 12 to about 95 mass % or less based on the total mass of monomers, the adhesive force of the pressure sensitive adhesive sheet can be sufficiently ensured. By setting the amount to about 60 mass % or more, the modulus of the pressure sensitive adhesive sheet can be kept in an appropriate range and the pressure sensitive adhesive sheet can have good wettability to an adherend.

A hydrophilic monomer may be contained in the monomer constituting the (meth)acrylic copolymer. By using a hydrophilic monomer, the adhesive force of the pressure sensitive adhesive sheet can be enhanced and/or hydrophilicity can be imparted to the pressure sensitive adhesive sheet. In the case where the pressure sensitive adhesive sheet imparted with hydrophilicity is used, for example, in an image display device, since the pressure sensitive adhesive sheet can absorb water vapor inside of the image display device, whitening due to dew condensation of such water vapor can be suppressed. This is advantageous particularly when the surface protective layer is a low moisture permeable material such as a glass plate or an inorganic deposited film and/or when the image display device or the like using the pressure sensitive adhesive sheet is used in a high-temperature high-humidity environment.

Examples of the hydrophilic monomer include, but are not limited to: an ethylenically unsaturated monomer having an acidic group such as carboxylic acid and sulfonic acid, a vinylamide, an N-vinyl lactam, a (meth)acrylamide and mixtures thereof. Specific examples thereof include, but are not limited to: acrylic acid, methacrylic acid, itaconic acid, maleic acid, styrenesulfonic acid, N-vinylpyrrolidone, N-vinylcaprolactam, N,N-dimethyl(meth)acrylamide, N,N-diethyl(meth)acrylamide, (meth)acrylonitrile and mixtures thereof.

From the standpoint of adjusting the modulus of the (meth)acrylic copolymer and ensuring wettability to an adherend, a (meth)acrylic acid hydroxyalkyl ester with the alkyl group having a carbon number of 4 or less, a (meth)acrylate containing an oxyethylene group, an oxypropylene group, an oxybutylene group or a group formed by connecting a combination of a plurality of these groups, a (meth)acrylate having a carbonyl group in the alcohol residue, and mixtures thereof may also be used as the hydrophilic monomer. Specific examples thereof include, but are not limited to: 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 4-hydroxybutyl acrylate, and a (meth)acrylate represented by the formula:

$$CH_2=C(R)COO-(AO)_p-(BO)_q-R' \qquad (1)$$

wherein each A is independently a group selected from the group consisting of $(CH_2)_rCO$, $CH_2CH_2$, $CH_2CH(CH_3)$ and $CH_2CH_2CH_2CH_2$, each B is independently a group selected from the group consisting of $(CH_2)_rCO$, $CO(CH_2)_r$, $CH_2CH_2$, $CH_2CH(CH_3)$ and $CH_2CH_2CH_2CH_2$, R is hydrogen or $CH_3$, R' is hydrogen or a substituted or unsubstituted alkyl group or aryl group, and each of p, q and r is an integer of 1 or more.

In formula (1), A is preferably $CH_2CH_2$ or $CH_2CH(CH_3)$ in view of availability in industry and control of moisture permeability of the obtained pressure sensitive adhesive sheet. B is also preferably $CH_2CH_2$ or $CH_2CH(CH_3)$ in view of availability in industry and control of moisture permeability of the obtained pressure sensitive adhesive sheet. In the case of copolymerizing the monomer by photopolymerization, in view of polymerizability, R is preferably H. In the case where R' is an alkyl group, the alkyl group may be linear, branched or cyclic. In certain embodiments, an alkyl group having a carbon number of from 1 to 12 or from 1 to 8 (specifically, methyl group, ethyl group, butyl group or octyl group) and exhibiting excellent compatibility with the (meth)acrylic acid alkyl ester with the alkyl group having a carbon number of 2 to 12 is used as R'. The numbers of p, q and r are not particularly limited in their upper limits, but when p is 10 or less, q is 10 or less and r is 5 or less, compatibility with the (meth) acrylic acid alkyl ester with the alkyl group having a carbon number of 2 to 12 is enhanced.

A hydrophilic monomer having a basic group such as an amino group may also be used. Blending of a (meth)acrylic copolymer obtained from a monomer containing a hydrophilic monomer having a basic group with a (meth)acrylic copolymer obtained from a monomer containing a hydrophilic monomer having an acid group may increase the viscosity of the coating solution, thereby increasing the coating thickness, controlling the adhesive force, etc. Furthermore, even when an ultraviolet cross-linkable site is not contained in the (meth)acrylic copolymer obtained from a monomer containing a hydrophilic monomer having a basic group, the effects of the blending above can be obtained, and such a (meth)acrylic copolymer can be cross-linked through an ultraviolet cross-linkable site of another (meth)acrylic copolymer. Specific examples thereof include, but are not limited to: N,N-dimethylaminoethyl acrylate, N,N-dimethylaminoethyl methacrylate (DMAEMA), N,N-diethylaminoethyl methacrylate, N,N-dimethylaminoethylacrylamide, N,N-dimethylaminoethylmethacrylamide, N,N-dimethylaminopropylacrylamide, N,N-dimethylaminopropylmethacrylamide, vinylpyridine and vinylimidazole.

As for the hydrophilic monomer, one kind may be used, or a plurality of kinds may be used in combination. In the case of using a hydrophilic monomer, the amount of the hydrophilic monomer is, based on the total mass of monomers, generally from about 5 to about 40 mass %, particularly from about 10 to about 30 mass %. In the latter case, the above-described whitening can be more effectively suppressed and at the same time, high flexibility and high adhesive force can be obtained.

As another ultraviolet cross-linkable site, a (meth)acryloyl structure can be also employed. A (meth)acrylic copolymer having a (meth)acryloyl structure in the side chain is cross-linked by ultraviolet irradiation. In this system, by adding a photoinitiator which is capable of being excited by visible light as well as ultraviolet light, the (meth)acrylic copolymer is able to be cross-linked not only by ultraviolet irradiation but also by visible light irradiation.

A (meth)acrylic copolymer having an (meth)acryloyl structure in the side chain is obtained by reacting a (meth) acrylic copolymer which has a reactive group in the side chain with a reactive (meth)acrylate. A (meth)acrylic copolymer having an (meth)acryloyl structure in the side chain is obtained by two step reaction. At the first step, a (meth)acrylic copolymer which has a reactive group in the side chain is synthesized. At the next step, the prepared polymer is reacted with a reactive (meth)acrylate. Various combinations of (meth)acrylic copolymers which have a reactive group in the side chain and a reactive (meth)acrylate are possible. An exemplary combination is a (meth)acrylic copolymer which has a hydroxyl group in the side chain and a (meth)acrylate which has an isocyanate group.

A(meth)acrylic copolymer which has a hydroxyl group in the side chain is prepared by copolymerization with, for example: 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 4-hydroxybutyl acrylate. Specific examples of a (meth) acrylate which has isocyanate group include, but are not limited to, 2-acryloyloxyethyl isocyanate, 2-methacryloyloxyethyl isocyanate, or 1,1-bis(acryloyloxymethyl)ethyl isocyanate.

Other monomers may be contained as the monomer used in the (meth)acrylic copolymer, within the range not impairing the characteristics of the pressure sensitive adhesive sheet. Examples thereof include a (meth)acrylic monomer other than those described above and a vinyl monomer such as vinyl acetate, vinyl propionate and styrene.

The (meth)acrylic copolymer can be formed by polymerizing the above-described monomer in the presence of a polymerization initiator. The polymerization method is not particularly limited, and the monomer may be polymerized by a normal radical polymerization such as solution polymerization, emulsion polymerization, suspension polymerization and bulk polymerization. Generally, radical polymerization using a thermal polymerization initiator is employed so as to allow for no reaction of the ultraviolet cross-linkable site. Examples of the thermal polymerization initiator include an organic peroxide such as benzoyl peroxide, tert-butyl perbenzoate, cumen hydroperoxide, diisopropyl peroxydicarbonate, di-n-propyl peroxydicarbonate, di(2-ethoxyethyl)peroxydicarbonate, tert-butyl peroxyneodecanoate, tert-butyl peroxypivalate, (3,5,5-trimethylhexanoyl)peroxide, dipropionyl peroxide and diacetyl peroxide; and an azo-based compound such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile) and 2,2'-azobis[2-(2-imidazolin-2-yl)propane]. The weight average molecular weight of the thus-obtained (meth)acrylic copolymer is generally about 30,000 or more, about 50,000 or more, or about 100,000 or more, and about 1,000,000 or less, about 500,000 or less, or about 300,000 or less. The glass transition temperature $T_g$ is generally about 0° C. or less, or about 10° C. or less.

The pressure sensitive adhesive sheet may further contain diphenyl(2,4,6-trimethylbenzoyl)phosphine oxide (TPO), a photoinitiator, rather than the above-described (meth)acryl copolymer. By adding TPO to the pressure sensitive adhesive sheet, the ultraviolet irradiation dose necessary for ultraviolet cross-linking can be decreased. As a result, for example, shortening of tact time or energy saving becomes possible and the process of laminating the adherend can be more efficient. Addition of TPO is advantageous particularly when the adherend contains an ultraviolet absorber and an ultraviolet ray is irradiated on the pressure sensitive adhesive sheet through the adherend.

Although not wishing to be bound by any theory, for example, when a benzophenone structure is used as the ultraviolet cross-linkable site, TPO is considered to have the following operating mechanism. The benzophenone structure is excited by UV-A (wavelength: 315 to 380 nm), and UV-B (wavelength: 280 to 315 nm) or UV-C (wavelength: 200 to 280 nm) must be irradiated. On the other hand, the excitation wavelength of TPO extends even into the visible light region, and the excited TPO is immediately cleaved to produce a radical. The radical produced participates in production of a radical in the benzophenone structure or another portion of the (meth)acrylic copolymer, as a result, cross-linking of the (meth)acrylic copolymer is accelerated. Accordingly, when TPO is added to the pressure sensitive adhesive sheet, an ultraviolet ray at a wavelength that is not utilized in the benzophenone structure can be effectively used.

The pressure sensitive adhesive sheet may contain additional components other than the above-described (meth) acrylic copolymer, such as filler and antioxidant. However, the (meth)acrylic copolymer itself has properties necessary for use as a pressure sensitive adhesive sheet, and therefore when the additional components are not added, this is advantageous in that potential contamination by the bleed-out of the components other than the (meth)acrylic copolymer or change in characteristics of the pressure sensitive adhesive sheet is not caused.

The storage modulus of the pressure sensitive adhesive sheet before ultraviolet cross-linking is from about $5.0 \times 10^4$ to about $1.0 \times 10^6$ Pa at 30° C. and 1 Hz. When the storage modulus at 30° C. and 1 Hz is about $5.0 \times 10^4$ Pa or more, the pressure sensitive adhesive sheet can maintain a cohesive force necessary for processing, handling, shape keeping and the like. When the storage modulus at 30° C. and 1 Hz is about $1.0 \times 10^6$ Pa or less, initial adherence (tack) necessary for applying a pressure sensitive adhesive sheet can be imparted to the pressure sensitive adhesive sheet.

Furthermore, the storage modulus of the pressure sensitive adhesive sheet before ultraviolet cross-linking is about $5.0 \times 10^4$ Pa or less at 80° C. and 1 Hz. When the storage modulus at 80° C. and 1 Hz is about $5.0 \times 10^4$ Pa or less, the heated pressure sensitive adhesive sheet can conform to a step, a bump or the like in a predetermined time (for example, from several seconds to several minutes) and flow to allow no formation of a gap in the vicinity thereof.

The storage modulus of the pressure sensitive adhesive sheet after ultraviolet cross-linking is about $1.0 \times 10^3$ Pa or more at 130° C. and 1 Hz. When the storage modulus at 130° C. and 1 Hz is about $1.0 \times 10^3$ Pa or more, the pressure sensitive adhesive sheet after ultraviolet cross-linking can be kept from flowing, and adhesion with long-term reliability can be realized.

The storage modulus of the pressure sensitive adhesive sheet can be adjusted by appropriately varying the kind, molecular weight and blending ratio of monomers constituting the (meth)acrylic copolymer contained in the pressure sensitive adhesive sheet and the polymerization degree of the (meth)acrylic copolymer. For example, the storage modulus rises when an ethylenically unsaturated monomer having an acidic group is used, and the storage modulus lowers when the amount of the (meth)acrylic acid alkyl ester with the alkyl group having a carbon number of 2 to 12, the (meth)acrylic acid hydroxyalkyl ester with the alkyl group having a carbon number of 4 or less, the (meth)acrylate containing an oxyethylene group, an oxypropylene group, an oxybutylene group or a group formed by connecting a combination of a plurality of these groups, or the (meth)acrylate having a carbonyl group in the alcohol residue is increased. When the polymerization degree of the (meth)acrylic copolymer is increased, the storage modulus tends to rise.

The thickness of the pressure sensitive adhesive sheet can be selected according to the usage and may be, for example, from about 5 µm to about 1 mm. One of bases for determining the thickness of the pressure sensitive adhesive sheet is the height of a step or a bump present on the adherend surface. As described above, according to this disclosure, the thickness of the pressure sensitive adhesive sheet can be reduced to the same level as the height of a step or a bump. In one embodiment where the adherend is substantially planar when the height of a step or a bump on the adherend surface is determined along the direction perpendicular to the spread-out planar surface of the pressure sensitive adhesive sheet applied to the adherend (the thickness direction of the pressure sensitive adhesive sheet), the thickness of the pressure sensitive adhesive sheet can be made to be about 0.8 times or more, about 1 times or more, or about 1.2 times or more, and about 5 times or less, about 3 times or less, or about 2 times or less, the maximum height of the step or bump. By providing the pressure sensitive adhesive sheet with such a thickness, the thickness of a laminate including an adherend can be kept small and, for example, reduction in the size and thickness of an image display device or enhancement of the sensitivity of a touch panel can be achieved.

The pressure sensitive adhesive sheet can be formed from the (meth)acrylic copolymer alone or a mixture of the (meth)acrylic copolymer and optional components (TPO and other additional components) by using a conventionally known method such as solvent casting and extrusion processing. The pressure sensitive adhesive sheet may have on one surface or both surfaces thereof a release film such as silicone-treated polyester film or polyethylene film.

Another embodiment of this disclosure is a laminate comprising a first substrate having a step or a bump on at least one surface, a second substrate and the above-described ultraviolet cross-linkable pressure sensitive adhesive sheet disposed between the first substrate and the second substrate. To at least one surface of the first substrate is in contact with the ultraviolet cross-linkable pressure sensitive adhesive sheet. In this laminate, the pressure sensitive adhesive sheet is in contact with the first substrate surface having a step or a bump and conforms to the step or bump and therefore, the vicinity of the step or bump is filled with the pressure sensitive adhesive sheet, allowing no formation of a gap near the step or bump.

Such a laminate can be produced by a method comprising disposing the ultraviolet cross-linkable pressure sensitive adhesive sheet to adjoin the first substrate on the step- or bump-containing surface side; disposing the second substrate to adjoin the ultraviolet cross-linkable pressure sensitive adhesive sheet; heating and/or pressurizing the ultraviolet cross-linkable pressure sensitive adhesive sheet to conform to the step or bump; and irradiating an ultraviolet ray on the ultraviolet cross-linkable pressure sensitive adhesive sheet. These steps can be performed in various orders.

In one embodiment, first, the pressure sensitive adhesive sheet is disposed to adjoin the first substrate on the step- or bump-containing surface side and the second substrate is disposed to adjoin the pressure sensitive adhesive sheet. In other words, the pressure sensitive adhesive sheet is sandwiched between the first substrate and the second substrate such that the surface having a step or a bump faces the pressure sensitive adhesive sheet. Next, the pressure sensitive adhesive sheet is heated and/or pressurized, thereby allowing the pressure sensitive adhesive sheet to conform to the step or bump. Thereafter, ultraviolet rays are irradiated from the first substrate side and/or the second substrate side on the pressure sensitive adhesive sheet through the substrate to cross-link the pressure sensitive adhesive sheet. In this way, the first substrate and the second substrate can be adhered without forming a gap in the vicinity of the step or bump of the first substrate. In this embodiment, the pressure sensitive adhesive sheet is heated and/or pressurized after disposing the first substrate and the second substrate to adjoin the pressure sensitive adhesive sheet, so that when a step or a bump is present on the second substrate surface to be adhered, for example, when the pressure sensitive adhesive sheet is applied on a polarizing plate attached to an image display module, the pressure sensitive adhesive sheet can conform to the step or bump of the second substrate and formation of a gap can be prevented also in the vicinity of such a step or gap.

In the embodiment above, at least one of the first substrate and the second substrate is at least partially transparent so that an ultraviolet ray necessary for the cross-linking of the pressure sensitive adhesive sheet can be irradiated through the substrate. In the case where the step or bump portion of the first substrate does not transmit an ultraviolet ray, an ultraviolet ray when irradiated from the first substrate side is not irradiated beneath the step or bump portion, but due to movement or the like of a radical generated in the irradiated portion, cross-linking of the pressure sensitive adhesive sheet proceeds also in the non-irradiated portion to some extent. In such a case, when the second substrate is a transparent substrate such as touch panel, an ultraviolet ray can be irradiated from the second substrate side, whereby an ultraviolet ray can also be irradiated on the pressure sensitive adhesive sheet in the portion corresponding to the step or bump portion and the pressure sensitive adhesive sheet can be more uniformly cross-linked.

In another embodiment, after disposing the pressure sensitive adhesive sheet to adjoin the first substrate on the step- or bump-containing surface side, the pressure sensitive adhesive sheet is heated and/or pressurized, thereby allowing the pressure sensitive adhesive sheet to conform to the step or bump. Thereafter, an ultraviolet ray is irradiated on the open surface of the pressure sensitive adhesive sheet to cross-link the pressure sensitive adhesive sheet. Furthermore, the second substrate is disposed to adjoin the pressure sensitive adhesive sheet, and the second substrate is laminated to the pressure sensitive adhesive sheet. In the case where the release film is transparent, an ultraviolet can also be irradiated on the pressure sensitive adhesive sheet through the release film. In this embodiment, an ultraviolet ray can be irradiated on the entire surface of the pressure sensitive adhesive sheet so that the pressure sensitive adhesive sheet can be more uniformly cross-linked. When the first substrate is at least partially transparent so that an ultraviolet ray necessary for the cross-linking of the pressure sensitive adhesive sheet can be irradiated therethrough, an ultraviolet ray can also be irradiated from the first substrate side. In this way, the first substrate and the second substrate can be adhered without forming a gap in the vicinity of the step or bump of the first substrate.

The heating step can be performed using a convection oven, a hot plate, a heat laminator, an autoclave or the like. In order to promote flowing of the pressure sensitive adhesive sheet and allow the pressure sensitive adhesive sheet to more efficiently conform to a step or a bump, it is preferred to apply a pressure simultaneously with heating by using a heat laminator, an autoclave or the like. Pressurization using an autoclave is advantageous particularly for defoaming the pressure sensitive adhesive sheet. The heating temperature of the pressure sensitive adhesive sheet may be a temperature at which the pressure sensitive adhesive sheet is softened or flows to sufficiently conform to a step or a bump. In one embodiment, the heating temperature can be generally about 30° C. or more, about 40° C. or more, or about 60° C. or more, and about 150° C. or less, about 120° C. or less, or about 100° C. or less. In the case of pressurizing the pressure sensitive adhesive sheet, the pressure applied can be generally about 0.05 MPa or more, or about 0.1 MPa or more, and about 2 MPa or less, or about 1 MPa or less.

The ultraviolet irradiation step can be performed using a general ultraviolet irradiation apparatus, for example, a conveyor belt-type ultraviolet irradiation apparatus where a low-pressure mercury lamp, a medium-pressure mercury lamp, a high-pressure mercury lamp, an ultrahigh-pressure mercury lamp, a xenon lamp, a metal halide lamp, an electrodeless lamp or the like is used as the light source. In one embodiment, the ultraviolet irradiation dose is generally from about 1,000 to about 5,000 mJ/cm$^2$.

For illustrative purposes, an embodiment where the first substrate is a surface protective layer having a step on the surface and the second substrate is an image display module or a touch panel is described below by referring to FIGS. 1 and 2.

The surface protective layer is disposed on the outermost surface of the image display module or touch panel and protects it from the outside. The surface protective layer is not particularly limited as long as it is a layer conventionally used as a protective material of an image display module or a touch panel. The surface protective layer may be, for example, an acrylic resin film such as polymethyl methacrylate (PMMA), a polycarbonate resin film or a glass plate. The thickness of the film or glass plate is generally from about 0.1 mm to about 5 mm, but is not limited thereto.

The surface protective layer on the observer side of the image display module or on the user side of the touch panel may be provided with a layer for imparting a function or a property, such as abrasion resistance, scratch resistance, antifouling property, antireflection and antistatic property. The layer for imparting abrasion resistance and scratch resistance can be formed by coating and curing a curable resin composition capable of forming a hardcoat. For example, a coating material composed of a partial condensation reaction product of a silane mixture containing an alkyltrialkoxysilane as the main component and colloidal silica may be coated and then cured by heating to form a cured film, or a coating material containing a multifunctional acrylate as the main component may be coated and the coating may be irradiated with an ultraviolet ray to form a cured film. For ensuring the antifouling property, a resin layer containing an organic silicon compound or a fluorine-based compound may be formed. Furthermore, for obtaining the antistatic property, a resin layer containing a surfactant or an electrically conductive fine particle may be formed. The layer for imparting such a function or a property is preferably a layer that does not inhibit the transparency of the surface protective layer, and is preferably as thin as possible without losing function. The thickness of the layer for imparting a function or a property is generally from about 0.05 µm to about 10 µm, but is not limited thereto.

In the embodiment described here, an additional layer such as printing layer or deposition layer is imparted to a partial region of the surface adjoining the pressure sensitive adhesive sheet, of the surface protective layer, and a step is formed on the surface of the surface protective layer. The printing layer or deposition layer is formed in a frame shape, for example, in the outer peripheral part of an image display module and functions as a light-shielding layer to hide the portion from view. The thickness of the printing layer or deposition layer used as such a light-shielding layer is generally from about 10 µm to about 20 µm for a black color having a high light-shielding effect and from about 40 µm to about 50 µm for a light-transmittable color such as white.

Examples of the image display module include, but are not limited to, an image display module for reflection-type or backlight-type liquid crystal display units, plasma display units, electroluminescence (EL) displays and electronic paper. On the display surface of the image display module, an additional layer (which may be either one layer or multiple layers) such as a polarizing plate (which sometimes has an uneven surface) can be provided. Also, the later-described touch panel may be present on the display surface of the image display module.

A touch panel is a transparent thin film-shaped device and when a user touches or presses a position on the touch panel with a finger or a pen, the position can be detected and specified. An example of a general position detecting system includes a resistance film system operating with a pressure applied to the touch panel and a capacitance system detecting the change in capacitance between a finger tip and the touch panel. The touch panel is mounted on an image display device such as CRT display or liquid crystal display and used in ATM, PC (personal computer), and portable terminals such as cellular phone and PDA.

FIG. 1 illustrates a cross-sectional view of one embodiment of the image display device including a pressure sensitive adhesive sheet 3. Image display device 10 has a structure where pressure sensitive adhesive sheet 3 and surface protective layer 4 are stacked in this order on the display surface of image display module 1. Surface protective layer 4 is composed of continuous layer 5 and light-shielding layer 6 provided in a partial region of the undersurface (on the side of pressure sensitive adhesive sheet 3) of continuous layer 5, and a step is formed on the surface. Incidentally, light-shielding layer 6 is formed by mixing a colorant in a coating solution comprising a curable resin composition, coating the resulting solution on a predetermined region of continuous layer 5 by an appropriate method such as screen printing, and curing the coating by an appropriate curing method such as ultraviolet irradiation. Pressure sensitive adhesive sheet 3 is applied on the step-containing surface of surface protective layer 4. Pressure sensitive adhesive sheet 3 satisfactorily conforms to the step produced by light-shielding layer 6 by applying heat and/or pressure before the ultraviolet irradiation. Therefore, a gap is not generated near the step. In addition, the internal residual stress of the pressure sensitive adhesive sheet is relieved so that display unevenness in the image display device can be prevented. Image display device 10 is obtained, for example, by applying laminate 2 composed of surface protective layer 4 and pressure sensitive adhesive sheet 3 to the display surface of image display module 1.

Figure 2:
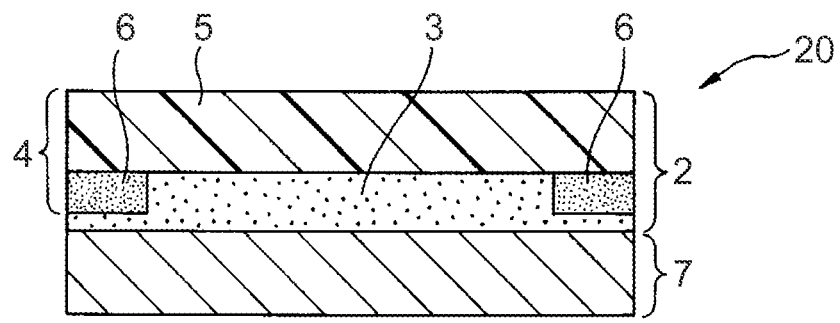
FIG. 2 is a cross-sectional view of one embodiment of a touch panel unit containing an ultraviolet cross-linkable pressure sensitive adhesive sheet of this disclosure.

FIG. 2 is a cross-sectional view of one embodiment of the touch panel unit including a pressure sensitive adhesive sheet 3. Touch panel unit 20 has a structure where pressure sensitive adhesive sheet 3 and surface protective layer 4 are stacked in this order on touch panel 7. The structure of laminate 2 obtained by stacking pressure sensitive adhesive sheet 3 and surface protective layer 4 in this order is the same as that shown in FIG. 1. Pressure sensitive adhesive sheet 3 satisfactorily conforms to the step produced by light-shielding layer 6, by applying heat and/or pressure before the ultraviolet irradiation, and therefore a gap is not generated near the step. Touch panel unit 20 is obtained, for example, by applying laminate 2 composed of surface protective layer 4 and pressure sensitive adhesive sheet 3 to touch panel 7. Also, an image display module having a display surface on the topside (not shown) may be attached to the bottom side of touch panel 7 directly or through another pressure sensitive adhesive sheet.

In still another embodiment of this disclosure, an electronic device containing the above-described image display module is provided. Examples of electronic devices include, but are not limited to: cellular phones, personal digital assistance (PDA) devices, potable game machines, electronic book terminals, car navigation systems, potable music players, clocks, televisions (TVs), video cameras, video players, digital cameras, Global Positioning System (GPS) devices and personal computers (PCs).

EXAMPLES

Abbreviations of Monomers and Initiators

EA: ethyl acrylate
BA: n-butyl acrylate
2EHA: 2-ethylhexyl acrylate
IOA: isooctyl acrylate
LA: lauryl acrylate
IBXA: isobornyl acrylate
AA: acrylic acid
HEA: 2-hydroxyethyl acrylate
4-HBA: 4-hydroxybutyl acrylate
ABP: 4-acryloyloxybenzophenone
AEBP: 4-acryloyloxyethoxybenzophenone
V-190: ethoxyethoxyethyl acrylate (produced by Osaka Organic Chemical Industry Ltd.)
NVC: N-vinyl caprolactone
HDDA: 1,6-hexanediol diacrylate
MMA: methyl methacrylate
EMA: ethyl methacrylate
nBMA: n-butyl methacrylate
DMAEMA: dimethylaminoethyl methacrylate
Karenz AOI (registered trademark): 2-acryloyloxyethyl isocyanate (produced by Showa Denko K.K.)
Darocur (registered trademark) TPO: photopolymerization initiator (diphenyl(2,4,6-trimethylbenzoyl)phosphine oxide (produced by Ciba Japan)
V-65: azo polymerization initiator (2,2'-azobis(2,4-dimethylvaleronitrile) (produced by Wako Pure Chemical Industries, Ltd.)
Irgacure (registered trademark) 651: photopolymerization initiator (2,2-dimethoxy-2-phenylacetophenone) (produced by Ciba Japan)

Production of Pressure Sensitive Adhesive Sheet

Example 1

An acrylic copolymer of a monomer containing an acrylic acid ester having an ultraviolet cross-linkable site was synthesized. As the acrylic acid ester includes an ultraviolet cross-linkable site, 4-acryloyloxybenzophenone (ABP) was used. A mixture of 2EHA/AA/ABP=87.5/12.5/0.35 (parts by mass) was prepared and diluted with methyl ethyl ketone (MEK) to have a monomer concentration of 40 mass %. Furthermore, V-65 as an initiator was added in a ratio of 0.4 mass % based on monomer components, and the system was nitrogen-purged for 10 minutes. Subsequently, the reaction was allowed to proceed in a constant 50° C. temperature bath for 24 hours. As a result, a transparent viscous solution was obtained. The weight average molecular weight of the obtained acrylic copolymer was 160,000 (in terms of polystyrene by gel permeation chromatography).

This polymerization solution was coated on a 50 μm-thick release film (heavy release surface of Cerapeel MIB(T) produced by Toray Advanced Film Co., Ltd.) by adjusting the gap of a knife coater to 120 μm and dried in an oven at 100° C. for 8 hours. The thickness of the pressure sensitive adhesive after drying was 30 μm. Subsequently, this pressure sensitive adhesive surface was laminated with a 38 μm-thick release film (Purex (registered trademark) A-31 produced by Teijin DuPont Films Japan Limited) to obtain a transfer-type pressure sensitive adhesive sheet.

Example 2

A transfer-type pressure sensitive adhesive sheet was obtained in the same manner as in Example 1, except that the prepared acrylic copolymer was 2EHA/AA/AEBP=87.5/12.5/0.35 (parts by mass). The weight average molecular weight of the obtained acrylic copolymer was 170,000 (in terms of polystyrene by gel permeation chromatography).

Example 3

A transfer-type pressure sensitive adhesive sheet was obtained in the same manner as in Example 1, except that the prepared acrylic copolymer was 2EHA/AA/AEBP=90.0/10.0/0.35 (parts by mass).

Example 4

A transfer-type pressure sensitive adhesive sheet was obtained in the same manner as in Example 1, except that the prepared acrylic copolymer was 2EHA/IBXA/AA/AEBP=77.5/10.0/12.5/0.35 (parts by mass).

Example 5

A transfer-type pressure sensitive adhesive sheet was obtained in the same manner as in Example 1, except for preparing the acrylic copolymer as 2EHA/IBXA/AA/AEBP=67.5/20.0/12.5/0.35 (parts by mass).

Example 6

In this Example, a transfer-type pressure sensitive adhesive sheet was produced using a blend of an acidic group-containing copolymer and a basic group-containing copolymer. Both the acidic group-containing copolymer and the basic group-containing copolymer contained an ultraviolet cross-linkable site in the molecule. For the acidic group-containing copolymer, a transparent viscous polymerization solution A was obtained as 2EHA/AA/AEBP=87.5/12.5/0.35 (parts by mass) by performing the reaction in the same manner as in Example 1. For the basic group-containing copolymer, a transparent viscous polymerization solution B was obtained as 2EHA/DMAEMA/AEBP=95.0/5.0/0.35 (parts by mass) by performing the reaction in the same manner as in Example 1.

The obtained polymerization solution A and polymerization solution B were mixed to give a ratio of copolymer in polymerization solution A/copolymer in polymerization solution B=100/10 (by mass), and a transfer-type pressure sensitive adhesive sheet was obtained in the same manner as in Example 1.

Example 7

For the basic group-containing copolymer, a polymerization solution B was obtained in the same manner as in Example 6, except that the prepared acrylic copolymer was MMA/nBMA/DMAEMA=69.0/25.0/6.0 (by mass). A transfer-type pressure sensitive adhesive sheet was obtained in the same manner as in Example 6, except for mixing the polymerization solution A of Example 6 and the obtained polymerization solution B in a ratio of polymerization solution A/polymerization solution B=100/5 (by mass). In this Example, only the acidic group-containing copolymer contained an ultraviolet cross-linkable site in the molecule.

Example 8

A transfer-type pressure sensitive adhesive sheet was obtained in the same manner as in Example 1, except that the prepared acrylic copolymer was BA/IBXA/HEA/AEBP=50.0/25.0/25.0/0.20 (by mass).

Example 9

A transfer-type pressure sensitive adhesive sheet was obtained in the same manner as in Example 1, except that the prepared acrylic copolymer was BA/IBXA/V-190/AA/AEBP=60.0/14.0/15.0/6.0/0.20 (by mass).

Example 10

A transfer-type pressure sensitive adhesive sheet was obtained in the same manner as in Example 1, except that the prepared acrylic copolymer was IOA/EA/AA/AEBP=72.5/15.0/12.5/0.35 (by mass).

Example 11

A (meth)acrylic copolymer having an (meth)acryloyl structure in the side chain as an ultraviolet crosslinkable site was synthesized. The acrylic copolymer was first obtained in the same manner as in Example 1, except that the prepared monomer mixture was EMA/LA/4-HBA=25.0/35.0/40.0 (parts by mass). Next, Karenz AOI (registered trademark) (4.5 wt % vs. polymer) and Darocur (registered trademark) TPO (0.5 wt % vs. polymer) were added to the resulting polymer solution.

The coating solution was then prepared and a transfer-type pressure sensitive adhesive sheet was obtained in the same manner as in Example 1, except that the sheet was aged at room temperature for 1 week.

Example 12

A transfer-type pressure sensitive adhesive sheet was obtained in the same manner as in Example 2, except for adding Darocur (registered trademark) TPO to the polymerization solution of Example 2 in an amount of 0.10 mass % based on the acrylic copolymer.

Comparative Example 1

A transfer-type pressure sensitive adhesive sheet was obtained in the same manner as in Example 7, except for mixing the polymerization solution A and the polymerization solution B used in Example 7 in a ratio of polymerization solution A/polymerization solution B=100/15 (by mass).

Comparative Example 2

A transfer-type pressure sensitive adhesive sheet was obtained in the same manner as in Example 1, except that the prepared acrylic copolymer was BA/IBXA/V-190/AA/AEBP=60.0/14.0/15.0/6.0/0.10 (by mass).

Comparative Example 3 acResin A204UV produced by BASF Japan was used as the ultraviolet cross-linkable polymer. This polymer is an acrylic polymer having a benzophenone group as a photo-cross-linking component and mainly comprising butyl acrylate and 2-ethylhexyl acrylate. A polymer solution was prepared using methyl ethyl ketone to contain the polymer above in a concentration of 40 mass % and coated by the same method as in Example 1 to obtain a transfer-type pressure sensitive adhesive sheet.

Comparative Example 4

A mixture of 2EHA/AA=87.5/12.5 (parts by mass) was prepared and loaded in a glass vessel. Irgacure (registered trademark) 651 as an initiator was added in a ratio of 0.04 mass % based on monomer components and mixed, and dissolved oxygen in the mixture was replaced with nitrogen gas. Subsequently, the mixture was partially polymerized by ultraviolet irradiation using a low-pressure mercury lamp for a few minutes to provide a viscous liquid having a viscosity of around 1,500 mPa·s. 0.10 parts by mass of HDDA as a cross-linker was mixed in 100 parts by mass of the resulting viscous liquid, Irgacure (registered trademark) 651 was added in a ratio of 0.1 mass % based on the mixture, and then the mixture was thoroughly stirred. The resulting mixture was subjected to defoaming under vacuum, and coated on a 50 µm-thick release film (heavy release surface of Cerapeel MIB(T) produced by Toray Advanced Film Co., Ltd.) to a thickness of 175 µm. Subsequently, in order to block oxygen, which inhibits polymerization, a 38 µm-thick release film (Purex (registered trademark) A-31 produced by Teijin DuPont Films Japan Limited) was disposed on the coated surface, and irradiation using a low-pressure mercury lamp for about four minutes from both sides provided a transfer-type pressure sensitive adhesive sheet. This pressure sensitive adhesive sheet is an acrylic pressure sensitive adhesive sheet obtained by an ultraviolet polymerization method and is already cross-linked.

Comparative Example 5

An acrylic copolymer solution was obtained as 2EHA/AA=87.5/12.5 (parts by mass) by performing the reaction in the same manner as in Example 1. Then, 1,1'-(1,3-phenylene-dicarbonyl)-bis-(2-methylaziridine) was added to this solution in a ratio of 0.1 mass % based on the solid content of copolymers and mixed. A transfer-type pressure sensitive adhesive sheet was obtained in the same manner as in Example 1, except for using the mixed solution above in place of the polymerization solution of Example 1. This pressure sensitive adhesive sheet was obtained by a solution polymerization method and is already cross-linked.

Measurement of Viscoelasticity

The transfer-type pressure sensitive adhesive sheets of Examples 1 to 11 and Comparative Examples 1 to 3 were measured for viscoelasticity. The viscoelasticity was measured in a shear mode (1 Hz) using a dynamic viscoelasticity measuring apparatus, ARES, manufactured by TA Instruments. Pressure sensitive adhesive sheets after removing the release film were stacked to a thickness of about 3 mm and the stack was punched out by a punch of 8 mm in diameter and used as a specimen. The measurement was performed at a temperature rising rate of 5° C./min in the temperature range of −60 to 200° C., and the storage modulus was recorded at 20, 30, 80, 100, 120 and 130° C. In addition, the transfer-type pressure sensitive adhesive sheets each subjected to ultraviolet irradiation using an ultraviolet irradiation apparatus, F-300, manufactured by Fusion UV Systems Japan KK (H-valve, 120 W/cm, 15 m/min×20 pass) were stacked in the same manner to a thickness of about 3 mm, and punched out by a punch of 8 mm in diameter to provide a specimen. The resulting specimens were measured for the viscoelasticity under the same conditions and the storage modulus was recorded at 20, 30, 80, 100, 120 and 130° C. The results are shown in Table 1.

In Comparative Example 3, the cohesive force of the pressure sensitive adhesive sheet before ultraviolet irradiation was excessively low such that the release film could not be removed without damaging the pressure sensitive adhesive sheet. Therefore, the storage modulus before ultraviolet irradiation could not be measured. Accordingly, the storage modulus before ultraviolet irradiation of the pressure sensitive adhesive sheet of Comparative Example 3 is estimated to be lower than the storage modulus after ultraviolet irradiation in any temperature condition.

The transfer-type pressure sensitive adhesive sheets of Examples 1 to 10 and Comparative Examples 1 to 5 were evaluated according to the following procedure.

Evaluation of the Step Conformability of the Pressure Sensitive Adhesive Sheet

An acrylic resin sheet (Acrylite (registered trademark) MR-200, produced by Mitsubishi Rayon Co., Ltd., 45 mm×65 mm×0.8 mm) where printing is applied to a region from the outer peripheral edge to about 5 mm inward of one surface was prepared as the surface protective layer having a printed frame. The step height of the printed frame was about 12 µm. The transfer-type pressure sensitive adhesive sheet after separating the release film on the light release side (for example, A-31) was laminated to the printed surface side of the acrylic resin sheet by using a heat laminator. At this time, the roll temperature was 80° C. and the roll pressure was 0.15 MPa. Subsequently, the remaining release film (for example, MIB) was separated and a float glass (50 mm×80 mm×0.55 mm) was laminated thereon under the same conditions as above. The condition after lamination was visually observed with the results shown in Table 2.

Good step conformability was obtained in all of Examples 1 to 10. That is, a gap was not produced near the printed step. By contrast, in Comparative Examples 1, 4 and 5, the pressure sensitive adhesive sheet failed to conform to the printed step and a gap was observed near the printed step. In Comparative Example 1, the initial adherence (tack) was excessively low due to high storage modulus at 30° C. and lamination was difficult. In Comparative Example 3, because of excessively low cohesive force before ultraviolet cross-linking, lamination could not be performed without ultraviolet irradiation and production of an evaluation sample was not feasible.

Reliability Test

To evaluate reliability, the performance stability under high-temperature high-humidity (65° C./90% RH) conditions of the sample laminated with the pressure sensitive adhesive sheet was evaluated.

The reliability test sample was prepared by the following procedure. A polarizing plate with a pressure sensitive adhesive (produced by Sanritz Corporation) was laminated to a float glass (50 mm×80 mm×0.55 mm) by a rubber roller. The transfer-type pressure sensitive adhesive sheet after separating the release film on the light release side (for example, A-31) was laminated to an acrylic plate (Acrylite (registered trademark) MR-200, produced by Mitsubishi Rayon Co., Ltd., 55 mm×85 mm×1.0 mm) by a heat laminator at a roll temperature of 80° C. and a roll pressure of 0.15 MPa. The remaining release film was separated and the polarizing plate/float glass laminate was laminated to the exposed pressure sensitive adhesive surface such that the polarizing plate side was brought into contact with the pressure sensitive adhesive surface. The obtained "acrylic plate/pressure sensitive adhesive sheet/polarizing plate/glass" laminate was passed through a heat laminator (roll temperature: 80° C., roll pressure: 0.15 MPa) and then subjected to ultraviolet irradiation using an ultraviolet irradiation apparatus, F-300, manufactured by Fusion UV Systems Japan KK (H-valve, 120 W/cm, 15 m/min×20 pass).

The reliability test sample of a transfer-type pressure sensitive adhesive sheet which is prepared with a (meth)acrylic copolymer having an (meth)acryloyl structure in the side chain was prepared by the following procedure. A polarizing plate with a pressure sensitive adhesive (produced by Sanritz Corporation) was laminated to a float glass (50 mm×80 mm×0.55 mm) by a rubber roller. The transfer-type pressure sensitive adhesive sheet (Example X), after separating the release film on the light release side (for example, A-31), was laminated to an acrylic plate (Acrylite (registered trademark) MR-200, produced by Mitsubishi Rayon Co., Ltd., 55 mm×85 mm×1.0 mm) by a heat laminator at a roll temperature of 80° C. and a roll pressure of 0.15 MPa. The remaining release film was separated and the polarizing plate/float glass laminate was laminated to the exposed pressure sensitive adhesive surface such that the polarizing plate side was brought into contact with the pressure sensitive adhesive surface. The obtained "acrylic plate/pressure sensitive adhesive sheet/polarizing plate/glass" laminate was passed through a heat laminator (roll temperature: 80° C., roll pressure: 0.15 MPa) and then subjected to ultraviolet irradiation using an ultraviolet irradiation apparatus, F-300, manufactured by Fusion UV Systems Japan KK (H-valve, 120 W/cm, 15 m/min×20 pass). The total energy measured by UV POWER PUCK® II (EIT, Inc.) was 209 mJ/cm2 for UV-A (320-390 nm) and 111 mJ/cm2 for UV-B (280-320 nm) and 19 mJ/cm2 for UV-C (250-260 nm).

The resulting laminate was set against a sample holder and placed in a constant-temperature constant-humidity vessel at 65° C./90% RH. After 3 days, the laminate was taken out and its outer appearance was visually confirmed. The sample where all of the movement (displacement) of the glass plate, foaming in the pressure sensitive adhesive sheet, and separation of the laminate were not observed was judged as "OK". The results are shown in Table 2.

Drop Test

The drop test sample was prepared by the following procedure. A polarizing plate with a pressure sensitive adhesive was laminated to an SUS plate (30 mm×60 mm×6 mm). Next, the transfer-type pressure sensitive adhesive sheet cut into a size of 10 mm×10 mm was laminated on the polarizing plate, and the remaining release film was separated. An acrylic plate (Acrylite (registered trademark) MR-200, produced by Mitsubishi Rayon Co., Ltd., 20 mm×54 mm×1 mm) was laminated to the exposed pressure sensitive adhesive surface, and the obtained "SUS plate/polarizing plate/pressure sensitive adhesive sheet/acrylic plate" laminate was passed through a heat laminator (roll temperature: 80° C., roll pressure: 0.15 MPa) and then subjected to ultraviolet irradiation using an ultraviolet irradiation apparatus, F-300, manufactured by Fusion UV Systems Japan KK (H-valve, 120 W/cm, 15 m/min×20 pass).

The drop test was performed by the following method. The same sample was repeatedly dropped as follows: 5 times from a height of 25 cm, 5 times from a height of 50 cm, 5 times from a height of 100 cm, 5 times from a height of 150 cm and 5 times from a height of 200 cm by using a drop tester (DT-202 manufactured by Shinyei Corporation). When separation was observed in the sample, the drop test was terminated. The sample where separation was not observed even after dropping 5 times from a height of 200 cm, was judged as "OK", and the other samples were judged as "NG". The results are shown in Table 2.

Using the transfer-type pressure sensitive adhesive sheets of Examples 2 and 11, the effect of the addition of Darocur (registered trademark) TPO was examined.

Evaluation of the Step Conformability of the Pressure Sensitive Adhesive Sheet

The transfer-type pressure sensitive adhesive sheet of Example 11 was also evaluated for step conformability in the same manner as in Example 1. Good step conformability was observed. The result is shown in Table 3.

Reliability Test

To evaluate reliability, the performance stability under high-temperature high-humidity (65° C./90% RH) conditions of a sample laminated with the pressure sensitive adhesive sheet was evaluated.

The reliability test sample was prepared by the following procedure. The transfer-type pressure sensitive adhesive sheet of Example 2 or 11 after separating the release film on the light release side (A-31) was laminated to an acrylic plate (Acrylite (registered trademark) MR-200, produced by Mitsubishi Rayon Co., Ltd., 55 mm×85 mm×1.0 mm) by using a rubber roller. The remaining release film was separated and after laminating a float glass (50 mm×80 mm×0.55 mm) by a rubber roller, the resulting laminate was passed through a heat laminator (roll temperature: 80° C., roll pressure: 0.15 MPa).

Subsequently, the laminate was irradiated with an ultraviolet ray from the acrylic plate side 8, 10, 12, 14, 16 or 18 times at a line speed of 15 m/min by using an ultraviolet irradiation apparatus, F-300, manufactured by Fusion UV Systems Japan KK (H-valve, 120 W/cm). The benzophenone group is known to be activated by an ultraviolet ray at a relatively short wavelength, such as UV-B or UV-C. The ultraviolet irradiation dose was measured by an actinometer, UV POWER PUCK (registered trademark) II, manufactured by EIT, and the quantity of light per 1 pass was 111 mJ/cm$^2$ in UV-B (280 to 320 nm) and 19 mJ/cm$^2$ in UV-C (250 to 260 nm). A laminate not subjected to ultraviolet irradiation was also prepared.

After curing at room temperature overnight, as the reliability test, the resulting laminate was set against a sample holder and placed in a constant-temperature constant-humidity vessel at 65° C./90% RH. After 3 days, the laminate was taken out therefrom, and its outer appearance was visually observed. The sample where all of the movement (displacement) of the glass plate, foaming in the pressure sensitive adhesive sheet, and separation of the laminate were not observed was judged as "OK". The results are shown in Table 3.

In the case of not performing ultraviolet irradiation, when the laminate was exposed to a high-temperature high-humidity environment, the glass laminated together slid off under its own weight because the cohesive force of the pressure sensitive adhesive sheet is poor regardless of the addition/no addition of Darocur (registered trademark) TPO. In the case where ultraviolet irradiation was performed, separation of the pressure sensitive adhesive sheet was observed until reaching a given irradiation dose. In Example 2 (Darocur (registered trademark) TPO was not added), when ultraviolet irradiation was performed 14 times or more, the reliability test was passed. On the other hand, in Example 11 (Darocur (registered trademark) TPO was added), it was confirmed that the reliability test was passed after performing ultraviolet irradiation 10 times. That is, a UV energy reduction of about 28% could be achieved by the addition of Darocur (registered trademark) TPO to the pressure sensitive adhesive sheet.

Drop Test

The drop test sample was prepared by the following procedure. A polarizing plate with a pressure sensitive adhesive was laminated to an SUS plate (30 mm×60 mm×6 mm). Next, the transfer-type pressure sensitive adhesive sheet of Example 2 or 11 cut into a size of 10 mm×10 mm was laminated on the polarizing plate and the remaining release film was separated. An acrylic plate (Acrylite (registered trademark) MR-200, produced by Mitsubishi Rayon Co., Ltd., 20 mm×54 mm×1 mm) was laminated to the exposed pressure sensitive adhesive surface, and the obtained "SUS plate/polarizing plate/pressure sensitive adhesive sheet/ acrylic plate" laminate was passed through a heat laminator (roll temperature: 80° C., roll pressure: 0.15 MPa). Thereafter, the laminate was irradiated with an ultraviolet ray from the acrylic plate side by using an ultraviolet irradiation apparatus, F-300, manufactured by Fusion UV Systems Japan KK (H-valve, 120 W/cm, 15 m/min×16 pass).

The drop test was performed by the following method. The same sample was repeatedly dropped as follows: 5 times from a height of 25 cm, 5 times from a height of 50 cm, 5 times from a height of 100 cm, 5 times from a height of 150 cm and 5 times from a height of 200 cm, by using a drop tester (DT-202 manufactured by Shinyei Corporation). When separation was observed in the sample, the drop test was terminated. The sample where separation was not observed even after dropping 5 times from a height of 200 cm, was judged as "OK", and the other samples were judged as "NG". The results are shown in Table 3.

As revealed from the results above, only the ultraviolet irradiation dose necessary for cross-linking can be reduced by adding Darocur (registered trademark) TPO to the pressure sensitive adhesive sheet without affecting other performances.

TABLE 1

| Example | Composition | Before UV Cross-linking G' (Pa) | | | | | |
|---|---|---|---|---|---|---|---|
| | | 20° C. | 30° C. | 80° C. | 100° C. | 120° C. | 130° C. |
| 1 | 2EHA/AA/ABP (87.5/12.5/0.35) | $2.4 \times 10^5$ | $1.2 \times 10^5$ | $8.2 \times 10^3$ | $1.3 \times 10^3$ | $5.5 \times 10^2$ | $2.2 \times 10^2$ |
| 2 | 2EHA/AA/AEBP (87.5/12.5/0.35) | $2.0 \times 10^5$ | $1.0 \times 10^5$ | $8.8 \times 10^3$ | $2.7 \times 10^3$ | $6.8 \times 10^2$ | $3.8 \times 10^2$ |
| 3 | 2EHA/AA/AEBP (90.0/10.0/0.35) | $1.0 \times 10^5$ | $5.8 \times 10^4$ | $5.4 \times 10^3$ | $1.4 \times 10^3$ | $2.5 \times 10^2$ | $1.0 \times 10^2$ |
| 4 | 2EHA/IBXA/AA/AEBP (77.5/10.0/12.5/0.35) | $5.2 \times 10^5$ | $2.2 \times 10^5$ | $1.8 \times 10^4$ | $6.5 \times 10^3$ | $1.9 \times 10^3$ | $9.5 \times 10^2$ |
| 5 | 2EHA/IBXA/AA/AEBP (67.5/20.0/12.5/0.35) | $1.7 \times 10^6$ | $5.5 \times 10^5$ | $3.0 \times 10^4$ | $1.1 \times 10^4$ | $3.6 \times 10^3$ | $1.0 \times 10^3$ |
| 6 | 2EHA/AA/AEBP (87.5/12.5/0.35): 2EHA/DMAEMA/AEBP (95.0/5.0/0.35) = 100:10 | $2.5 \times 10^5$ | $1.3 \times 10^5$ | $1.1 \times 10^4$ | $3.3 \times 10^3$ | $9.0 \times 10^2$ | $4.3 \times 10^2$ |
| 7 | 2EHA/AA/AEBP (87.5/12.5/0.35): MMA/nBMA/DMAEMA (69.0/25.0/6.0) = 100:5 | $3.8 \times 10^5$ | $1.9 \times 10^5$ | $1.7 \times 10^4$ | $6.0 \times 10^3$ | $2.0 \times 10^3$ | $1.1 \times 10^3$ |
| 8 | BA/IBXA/HEA/AEBP (50.0/25.0/25.0/0.20) | $2.9 \times 10^5$ | $1.4 \times 10^5$ | $1.5 \times 10^4$ | $5.9 \times 10^3$ | $2.4 \times 10^3$ | $1.5 \times 10^3$ |
| 9 | BA/IBXA/V-190/AA/AEBP (60.0/14.0/15.0/6.0/0.20) | $8.6 \times 10^4$ | $5.3 \times 10^4$ | $4.6 \times 10^3$ | $1.5 \times 10^3$ | $4.3 \times 10^2$ | $2.2 \times 10^2$ |
| 10 | IOA/EA/AA/AEBP (72.5/15.0/12.5/0.35) | $3.1 \times 10^5$ | $1.5 \times 10^5$ | $1.4 \times 10^4$ | $4.7 \times 10^3$ | $1.4 \times 10^3$ | $6.7 \times 10^2$ |
| 11 | EMA/LA/4-HBA = 25.0/35.0/40.0 with Karenz AOI(registered trademark) (4.5 wt % based on copolymer) and Darocur (registered trademark) TPO (0.5 wt % based on copolymer) | $1.4 \times 10^5$ | $9.0 \times 10^4$ | $1.3 \times 10^4$ | $5.3 \times 10^3$ | $2.0 \times 10^3$ | $1.2 \times 10^3$ |
| 12 | 2EHA/AA/AEBP (87.5/12.5/0.35) + Darocur(registered trademark)TPO (0.10 wt % based on copolymer) | $2.0 \times 10^5$ | $1.0 \times 10^5$ | $8.8 \times 10^3$ | $2.7 \times 10^3$ | $6.8 \times 10^2$ | $3.8 \times 10^2$ |
| Comparative Example 1 | 2EHA/AA/AEBP (87.5/12.5/0.35): MMA/nBMA/DMAEMA (69.0/25.0/6.0) = 100:15 | $3.3 \times 10^6$ | $1.8 \times 10^6$ | $6.0 \times 10^4$ | $2.2 \times 10^4$ | $1.0 \times 10^4$ | $8.2 \times 10^3$ |
| Comparative Example 2 | BA/IBXA/V-190/AA/AEBP (60.0/14.0/15.0/6.0/0.10) | $8.0 \times 10^4$ | $5.0 \times 10^4$ | $4.1 \times 10^3$ | $1.3 \times 10^3$ | $3.6 \times 10^2$ | $1.8 \times 10^2$ |
| Comparative Example 3 | acResin A204UV | n.a. | n.a. | n.a. | n.a. | n.a. | n.a. |

| Example | After UV Cross-linking G' (Pa) | | | | | |
|---|---|---|---|---|---|---|
| | 20° C. | 30° C. | 80° C. | 100° C. | 120° C. | 130° C. |
| 1 | $2.4 \times 10^5$ | $1.2 \times 10^5$ | $1.1 \times 10^4$ | $4.3 \times 10^3$ | $1.7 \times 10^3$ | $1.1 \times 10^3$ |
| 2 | $2.0 \times 10^5$ | $1.0 \times 10^5$ | $1.2 \times 10^4$ | $5.3 \times 10^3$ | $2.5 \times 10^3$ | $1.7 \times 10^3$ |
| 3 | $1.4 \times 10^5$ | $8.3 \times 10^4$ | $1.2 \times 10^4$ | $6.6 \times 10^3$ | $3.7 \times 10^3$ | $2.9 \times 10^3$ |
| 4 | $4.7 \times 10^5$ | $2.1 \times 10^5$ | $2.7 \times 10^4$ | $1.6 \times 10^4$ | $9.8 \times 10^3$ | $7.7 \times 10^3$ |
| 5 | $1.74 \times 10^6$ | $5.5 \times 10^5$ | $4.0 \times 10^4$ | $2.2 \times 10^4$ | $1.2 \times 10^4$ | $9.6 \times 10^3$ |
| 6 | $3.1 \times 10^5$ | $1.6 \times 10^5$ | $2.1 \times 10^4$ | $1.1 \times 10^4$ | $6.2 \times 10^3$ | $4.8 \times 10^3$ |
| 7 | $5.4 \times 10^5$ | $2.7 \times 10^5$ | $3.2 \times 10^4$ | $1.6 \times 10^4$ | $8.7 \times 10^3$ | $6.7 \times 10^3$ |
| 8 | $3.1 \times 10^5$ | $1.5 \times 10^5$ | $2.5 \times 10^4$ | $1.3 \times 10^4$ | $8.0 \times 10^3$ | $6.6 \times 10^3$ |

TABLE 1-continued

| | | | | | | |
|---|---|---|---|---|---|---|
| 9 | $9.3 \times 10^4$ | $6.2 \times 10^4$ | $1.1 \times 10^4$ | $6.5 \times 10^3$ | $4.1 \times 10^3$ | $3.4 \times 10^3$ |
| 10 | $3.1 \times 10^5$ | $1.5 \times 10^5$ | $2.2 \times 10^4$ | $1.2 \times 10^4$ | $7.1 \times 10^3$ | $5.6 \times 10^3$ |
| 11 | $1.9 \times 10^5$ | $1.3 \times 10^5$ | $4.1 \times 10^4$ | $3.2 \times 10^4$ | $2.7 \times 10^4$ | $2.5 \times 10^4$ |
| 12 | $2.0 \times 10^5$ | $1.0 \times 10^5$ | $1.2 \times 10^4$ | $5.3 \times 10^3$ | $2.5 \times 10^3$ | $1.7 \times 10^3$ |
| Comparative Example 1 | $5.2 \times 10^6$ | $3.0 \times 10^6$ | $1.1 \times 10^5$ | $3.9 \times 10^4$ | $2.3 \times 10^4$ | $1.8 \times 10^4$ |
| Comparative Example 2 | $8.4 \times 10^4$ | $5.4 \times 10^4$ | $6.7 \times 10^3$ | $3.0 \times 10^3$ | $1.3 \times 10^3$ | $8.5 \times 10^2$ |
| Comparative Example 3 | $6.0 \times 10^4$ | $3.8 \times 10^4$ | $7.8 \times 10^3$ | $5.4 \times 10^3$ | $4.1 \times 10^3$ | $3.7 \times 10^3$ | n.a.: Unmeasurable

TABLE 2

| Example | Composition | Step Conformability | Reliability 65° C./90% RH | Drop Test |
|---|---|---|---|---|
| 1 | 2EHA/AA/ABP (87.5/12.5/0.35) | OK | OK | OK |
| 2 | 2EHA/AA/AEBP (87.5/12.5/0.35) | OK | OK | OK |
| 3 | 2EHA/AA/AEBP (90.0/10.0/0.35) | OK | OK | OK |
| 4 | 2EHA/IBXA/AA/AEBP (77.5/10.0/12.5/0.35) | OK | OK | — |
| 5 | 2EHA/IBXA/AA/AEBP (67.5/20.0/12.5/0.35) | OK | OK | — |
| 6 | 2EHA/AA/AEBP (87.5/12.5/0.35): 2EHA/DMAEMA/AEBP (95.0/5.0/0.35) = 100:10 | OK | OK | — |
| 7 | 2EHA/AA/AEBP (87.5/12.5/0.35):MMA/nBMA/DMAEMA (69.0/25.0/6.0) = 100:5 | OK | OK | — |
| 8 | BA/IBXA/HEA/AEBP (50.0/25.0/25.0/0.20) | OK | OK | — |
| 9 | BA/IBXA/V-190/AA/AEBP (60.0/14.0/15.0/6.0/0.20) | OK | OK | — |
| 10 | IOA/EA/AA/AEBP (72.5/15.0/12.5/0.35) | OK | OK | — |
| 11 | EMA/LA/4-HBA = 25.0/35.0/40.0 with Karenz AOI(registered trademark) (4.5 wt % based on copolymer) and Darocur (registered trademark) TPO (0.5 wt % based on copolymer) | OK | OK | — |
| Comparative Example 1 | 2EHA/AA/AEBP (87.5/12.5/0.35):MMA/nBMA/DMAEMA (69.0/25.0/6.0) = 100:15 | NG | OK | — |
| Comparative Example 2 | BA/IBXA/V-190/AA/AEBP (60.0/14.0/15.0/6.0/0.10) | OK | NG | — |
| Comparative Example 3 | acResin A204UV | unable to produce | unable to produce | — |
| Comparative Example 4 | Cross-linked acrylic pressure sensitive adhesive sheet (by UV polymerization) | NG | — | NG |
| Comparative Example 5 | Cross-linked acrylic pressure sensitive adhesive sheet (by solvent polymerization) | NG | — | NG |

TABLE 3

| Example | Composition | Step Conformability | Reliability 65° C./90% RH | Drop Test |
|---|---|---|---|---|
| 2 | 2EHA/AA/AEBP (87.5/12.5/0.35) | OK | OK (UV irradiation: 14 times or more) | OK |
| 11 | 2EHA/AA/AEBP (87.5/12.5/0.35) + Darocur (registered trademark)TPO (0.10 wt % based on copolymer) | OK | OK (UV irradiation: 10 times or more) | OK |

The invention claimed is:

1. An ultraviolet cross-linkable pressure sensitive adhesive sheet comprising:
a (meth)acrylic copolymer of a monomer containing a (meth)acrylic acid ester having an ultraviolet cross-linkable site,
wherein the ultraviolet cross-linkable site has a benzophenone structure,
wherein the storage modulus of the pressure sensitive adhesive sheet before ultraviolet cross-linking is from $5.0 \times 10^4$ to $1.0 \times 10^6$ Pa at 30° C. and 1 Hz and $5.0 \times 10^4$ Pa or less at 80° C. and 1 Hz, and
wherein the storage modulus of the pressure sensitive adhesive sheet after ultraviolet cross-linking is $1.0 \times 10^3$ Pa or more at 130° C. and 1 Hz.

2. The ultraviolet crosslinkable pressure sensitive adhesive sheet as claimed in claim 1, wherein the ultraviolet crosslinkable site has an (meth)acryloyl structure.

3. The ultraviolet cross-linkable pressure sensitive adhesive sheet as claimed in claim 1, wherein the monomer contains a hydrophilic monomer and the content of the hydrophilic monomer is from 10 to 30 mass % based on the total mass of monomers.

4. The ultraviolet cross-linkable pressure sensitive adhesive sheet as claimed in claim 1, wherein the ultraviolet cross-linkable pressure sensitive adhesive sheet further contains diphenyl(2,4,6-trimethylbenzoyl)phosphine oxide.

5. A laminate comprising a first substrate having a step or a bump on at least one surface, a second substrate and the ultraviolet cross-linkable pressure sensitive adhesive sheet claimed in claim 1, which is disposed between said first substrate and the second substrate, wherein the at least one surface of the first substrate is in contact with the ultraviolet cross-linkable pressure sensitive adhesive sheet and the ultraviolet cross-linkable pressure sensitive adhesive sheet conforms to the step or bump.

6. The laminate as claimed in claim 5, wherein the first substrate is a surface protective layer and the second substrate is an image display module or a touch panel.

7. A method of producing a laminate, wherein the laminate includes a first substrate having a step or a bump on at least one surface, a second substrate and the ultraviolet cross-linkable pressure sensitive adhesive sheet claimed in claim 1, which is disposed between the first substrate and the second substrate, the method comprising:
- disposing the ultraviolet cross-linkable pressure sensitive adhesive sheet to adjoin the first substrate on said at least one surface side;
- disposing said second substrate to adjoin the ultraviolet cross-linkable pressure sensitive adhesive sheet;
- heating and/or pressurizing the ultraviolet cross-linkable pressure sensitive adhesive sheet to conform to the step or bump; and
- irradiating an ultraviolet ray on the ultraviolet cross-linkable pressure sensitive adhesive sheet.

* * * * *